United States Patent
Kuo

(10) Patent No.: US 7,724,675 B2
(45) Date of Patent: May 25, 2010

(54) USHA CARD AND UPS SYSTEM INCORPORATING THE SAME

(75) Inventor: Heng-Chen Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1191 days.

(21) Appl. No.: 11/311,979

(22) Filed: Dec. 19, 2005

(65) Prior Publication Data
US 2006/0143347 A1 Jun. 29, 2006

(30) Foreign Application Priority Data
Dec. 24, 2004 (CN) ............ 2004 1 0091858

(51) Int. Cl.
*H04L 12/26* (2006.01)

(52) U.S. Cl. .................... 370/241; 710/105

(58) Field of Classification Search ............ None
See application file for complete search history.

(56) References Cited

U.S. PATENT DOCUMENTS

| | | | | |
|---|---|---|---|---|
| 5,799,208 A * | 8/1998 | Hwang et al. | ............. | 710/38 |
| 6,424,627 B1 * | 7/2002 | Sørhaug et al. | ............. | 370/241 |
| 6,772,253 B1 * | 8/2004 | Slaight et al. | ............. | 710/105 |
| 6,775,715 B2 * | 8/2004 | Spitaels et al. | ............. | 710/8 |
| 6,981,093 B2 * | 12/2005 | Minowa et al. | ............. | 711/113 |
| 7,280,754 B2 * | 10/2007 | Doh et al. | ............. | 398/4 |
| 7,350,088 B2 * | 3/2008 | Allison et al. | ............. | 713/300 |

* cited by examiner

*Primary Examiner*—Steven H Nguyen
(74) *Attorney, Agent, or Firm*—Zhigang Ma

(57) ABSTRACT

A USHA (UPS SNMP HTTP AGENT) card (310) includes an interface (400); a CPU (700); a connector (900); a first transceiver (510) including a receiver (511) electrically connected between the interface and the CPU, and a transmitter (512) electrically connected to the interface; a first multiplexer (610) electrically connected between the transmitter of the first transceiver and the CPU; a second transceiver (520) including a receiver (521) electrically connected between the connector and the CPU, and a transmitter (522) electrically connected to the connector; and a second multiplexer (620) electrically connected between the transmitter of the second transceiver and the CPU. The first and second multiplexers are capable of being controlled by the CPU to electrically connect the transmitter of the first transceiver and receiver of the second transceiver and the transmitter of the second transceiver and receiver of the first transceiver.

12 Claims, 3 Drawing Sheets

USHA CARD AND UPS SYSTEM INCORPORATING THE SAME

BACKGROUND OF THE INVENTION

1. Field of the Invention

The present invention relates to a USHA card and a UPS system which incorporates the USHA card.

2. General Background

Referring to FIG. 3, a UPS (Uninterrupted Power Supply) system with a network communication function is shown, which includes a PC (Personal Computer) 10', a UPS 30' electrically connected to the PC 10', a typical USHA (UPS SNMP HTTP AGENT) card 310' plugged in the UPS 30' for the network function. The PC 10' includes two serial ports 110', 120'. The USHA card 310' includes a serial port 400' and a connector 500'. The UPS 30' includes a control board 330', first and second buses 320', 321', and a serial port 410'. The first bus 320' is electrically connected between the connector 500' and the control board 330', and a serial cable 20' is provided to connect the serial port 400' of the USHA card 310' and the serial port 110' of the PC 10', for remotely managing the UPS 30' via the USHA card 310'. The second bus 321' is electrically connected between the serial port 410' and the control board 330', another serial cable 21' is provided to electrically connect the serial port 120' of the PC 10' and the serial port 410' of the UPS 30' for realizing communication between the PC 10' and the UPS 30' and firmware-upgrading of the UPS 30'. However, the UPS system needs two serial cables and two buses to manage the UPS and communication between the UPS and the PC.

What is desired, therefore, is a USHA card via which a UPS can communicate with a PC. What is also desired is a UPS system which reduces the number of serial cables and buses required.

SUMMARY

In one preferred embodiment, a USHA (UPS SNMP HTTP AGENT) card includes an interface; a CPU; a connector; a first transceiver including a receiver electrically connected between the interface and the CPU, and a transmitter electrically connected to the interface; a first multiplexer electrically connected between the transmitter of the first transceiver and the CPU; a second transceiver including a receiver electrically connected between the connector and the CPU, a transmitter electrically connected to the connector; and a second multiplexer electrically connected between the transmitter of the second transceiver and the CPU, the first and second multiplexers capable of being controlled by the CPU to electrically connect with the receivers of the second and first transceivers respectively.

A UPS (Uninterrupted Power Supply) system includes a computer; a UPS; and a USHA card electrically connected between the computer and the UPS, the USHA card including a switch for switching between a managing mode via which the UPS is managed and a communication mode via which the UPS communicates with the computer.

Other advantages and novel features will become more apparent from the following detailed description of a preferred embodiment when taken in conjunction with the accompanying drawings, in which:

DETAILED DESCRIPTION OF THE EMBODIMENT

Figure 1:
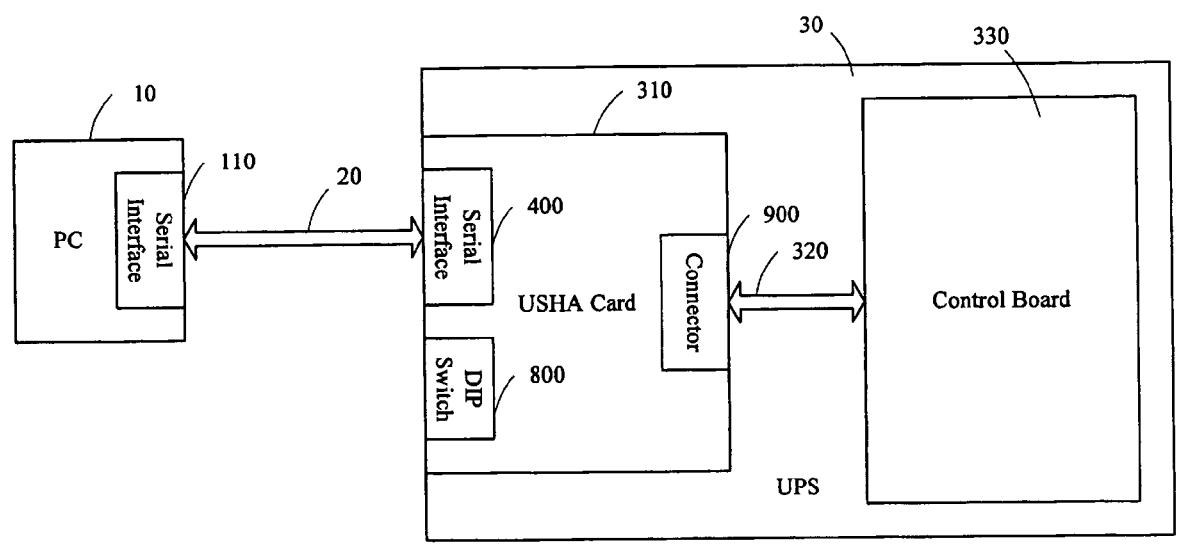
FIG. 1 is a block diagram of a UPS system in accordance with a preferred embodiment of the present invention, the UPS system including a USHA card.

Referring to FIG. 1, a UPS (Uninterrupted Power Supply) system is provided, which includes a network control system like a PC (Personal Computer) 10, a UPS 30, an improved USHA (UPS SNMP HTTP AGENT) card 310 plugged in the UPS 30, and a serial cable 20 connecting the PC 10 with the USHA Card 310.

The PC 10 includes a serial interface 110, the USHA card 310 includes a serial interface 400, and the serial cable 20 electrically connects the serial interfaces 110, 400. The USHA card 310 further includes a DIP switch 800 for switching operation modes thereof, and a connector 900 referred to as a gold finger by a person skilled in the art. The UPS 30 includes a control board 330. A bus 320 is provided to connect the connector 900 and the control board 330, and a UART (Universal Asynchronous Receiver/Transmitter) (not shown) is provided to cooperate with the bus 320 to electrically connect the control board 330 and the USHA card 310.

Figure 2:
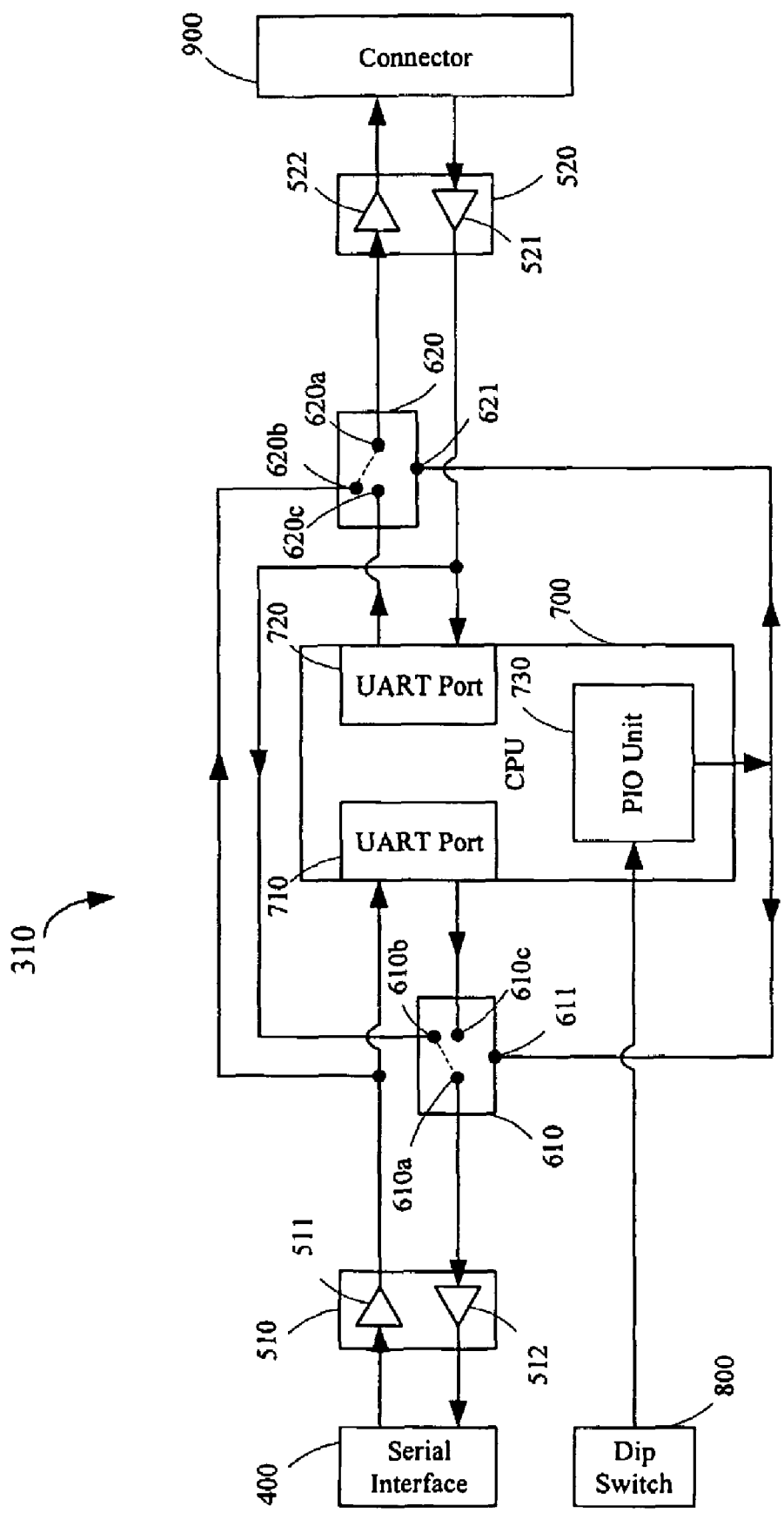
FIG. 2 is a circuit diagram of the USHA card of FIG. 1.
Figure 3:
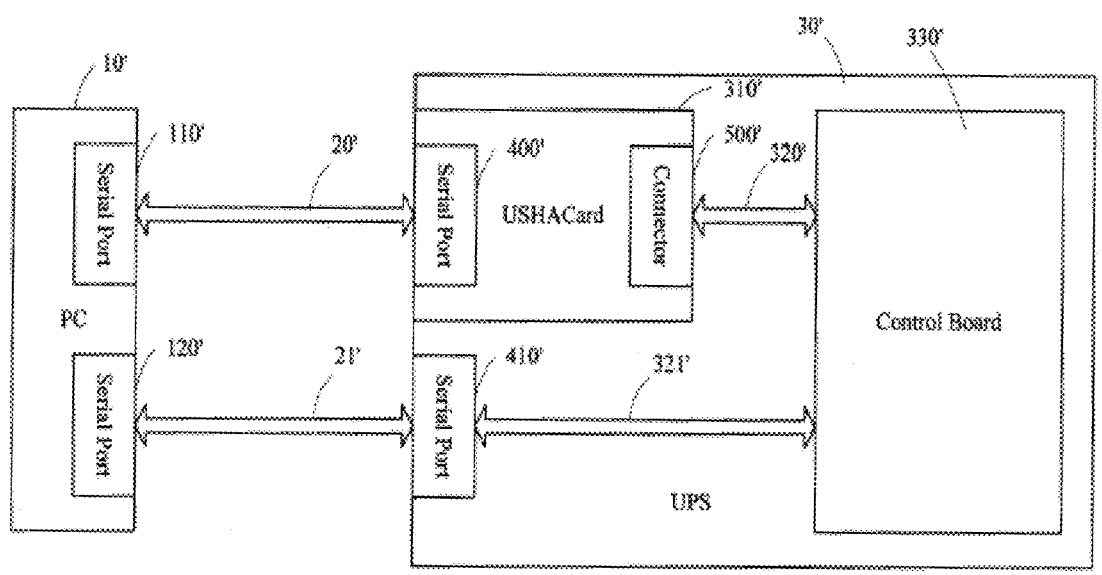
FIG. 3 is a block diagram of a typical UPS system.

Referring to FIG. 2, the USHA card 310 further includes first and second transceivers 510, 520, dual-channel first and second multiplexers 610, 620, and a CPU (Central Processing Unit) 700. The first transceiver 510 includes a receiver 511, and a transmitter 512, and the second transceiver 520 includes a receiver 521 and a transmitter 522. The first multiplexer 610 includes a signal output port 610a, two signal input ports 610b, 610c, and a control port 611, and the second multiplexer 620 includes a signal output port 620a, two signal input ports 620b, 620c, and a control port 621. The CPU 700 includes first and second UART ports 710, 720, and a PIO (Programmable Input Output) unit 730.

The receiver 511 of the first transceiver 510 is electrically connected between the serial interface 400 and the first UART port 710 of the CPU 700, and the transmitter 512 is electrically connected between the serial interface 400 and the signal output port 610a of the first multiplexer 610. The signal input port 610c of the first multiplexer 610 is electrically connected to the first UART port 710 of the CPU 700, and the control port 611 is electrically connected to the PIO unit 730. The receiver 521 of the second transceiver 520 is electrically connected between the connector 900 and the second UART port 720 of the CPU 700, and the transmitter 522 is electrically connected between the connector 900 and the signal output port 620a of the second multiplexer 620. The signal input port 620c of the second multiplexer 620 is electrically connected to the second UART port 720 of the CPU 700, and the control port 621 is electrically connected to the PIO unit 730. The signal input port 610b of the first multiplexer 610 is electrically connected to the receiver 521 of the second transceiver 520, and the signal input port 620b of the second multiplexer 620 is electrically connected to the receiver 511 of the first transceiver 510. The DIP switch 800 is electrically connected to the PIO unit 730 of the CPU 700, for controlling action of the first and second multiplexers 610, 620 via the PIO unit 730.

In use, the USHA card 310 is plugged in the UPS system. When the DIP switch 800 is switched 'on', the PIO unit 730 is actuated by the DIP switch 800 to send control signals to the control ports 611, 621 respectively of the first and second multiplexers 610, 620, the signal output port 610a and the signal input port 610b of the first multiplexer 610 are electrically connected, and the signal output port 620a and the signal input port 620b of the second multiplexer 620 are electrically connected. The receiver 511 of the first transceiver 510 is thus electrically connected to the transmitter 522 of the second transceiver 520 via the signal input port 620*b* and the signal output 620*a*. The receiver 521 of the second transceiver 520 is thus electrically connected to the transmitter 512 of the first transceiver 510 via the signal input port 610*b* and the signal output 610*a*. The first and second transceivers 510, 520 are directly electrically connected. The PC 10 and the control board 330 of the UPS 30 communicate via the directly electrically connected first and second transceivers 510, 520 of the USHA card 310. The CPU 700 detects the status of the PC 10 via the serial interface 400 and the receiver 511 of the first multiplexer 510 and the status of the UPS 30 via the connector 900 and the receiver 521 of the second multiplexer 510.

When the DIP switch 800 is switched 'off', the PIO unit 730 is actuated to send control signal to the control ports 611, 621 respectively of the first and second multiplexers 610, 620, the signal output port 610*a* and the signal input ports 610*c* of the first multiplexer 610 are electrically connected, and the signal output port 620*a* and the signal input port 620*c* of the second multiplexer 620 are electrically connected. The first and second transceivers 510, 520 are electrically connected via the first and second UART ports 710, 720 of the CPU 700. The UPS 30 can be remotely managed via the USHA card 310.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. A USHA (UPS SNMP HTTP AGENT) card, comprising:
    an interface;
    a CPU;
    a connector;
    a first transceiver comprising a receiver electrically connected between the interface and the CPU, and a transmitter electrically connected to the interface;
    a first multiplexer electrically connected between the transmitter of the first transceiver and the CPU;
    a second transceiver comprising a receiver electrically connected between the connector and the CPU, and a transmitter electrically connected to the connector; and
    a second multiplexer electrically connected between the transmitter of the second transceiver and the CPU, the first and second multiplexers capable of being controlled by the CPU to electrically connect with the transmitter of the first transceiver and receiver of the second transceiver and the transmitter of the second transceiver and receiver of the first transceiver.

2. The USHA card as claimed in claim 1, wherein each of the first and second multiplexers comprises a signal output port, and two signal input ports, the signal input ports of the first multiplexer are electrically connected to the CPU and the receiver of the second transceiver respectively, the signal input ports of the second multiplexer are electrically connected to the CPU and the receiver of the first transceiver respectively, the CPU controls the signal output port to selectively connect with one of the signal input ports of each of the first and second multiplexers.

3. The USHA card as claimed in claim 2, wherein each of the first and second multiplexers further comprises a control port, the CPU comprises a PIO (Programmable Input Output) port electrically connected to the control port of each of the first and second multiplexers, for controlling the first and second multiplexers.

4. The USHA card as claimed in claim 2, wherein each of the first and second multiplexers is dual-channel.

5. The USHA card as claimed in claim 1, further comprising a DIP switch electrically connected to the PIO unit of the CPU for actuating the CPU to control the first and second multiplexers.

6. A UPS (Uninterrupted Power Supply) system comprising:
    a computer;
    a UPS; and
    a USHA card electrically connected between the computer and the UPS, the USHA card comprising:
    an interface;
    CPU;
    a connector;
    a first transceiver comprising a receiver electrically connected between the interface and the CPU, and a transmitter electrically connected to the interface;
    a first multiplexer electrically connected between the transmitter of the first transceiver and the CPU;
    a second transceiver comprising a receiver electrically connected between the connector and the CPU, and a transmitter electrically connected to the connector;
    a second multiplexer electrically connected between the transmitter of the second transceiver and the CPU, the first and second multiplexers capable of being controlled by the CPU to electrically connect to the transmitter of the first transceiver and receiver of the second transceiver and the transmitter of the second transceiver and receiver of the first transceiver; and
    a switch to switch between a managing mode via which the UPS is managed and a communication mode via which the UPS communicates with the computer.

7. The UPS system as claimed in claim 6, wherein each of the first and second multiplexers comprises a signal output port, and two signal input ports, the signal input ports of the first multiplexer are electrically connected to the CPU and the receiver of the second transceiver corresponding to the managing mode and the communication mode respectively, the signal input ports of the second multiplexer are electrically connected to the CPU and the receiver of the first transceiver corresponding to the managing mode and the communication mode respectively, the CPU controls the signal output port to connect with one of the signal input ports of each of the first and second multiplexers for switching between the managing mode and the communication mode.

8. The UPS system as claimed in claim 7, wherein the DIP switch is electrically connected to the PIO unit of the CPU for actuating the CPU to control the first and second multiplexers.

9. The UPS system as claimed in claim 6, wherein the computer comprises a serial interface, and a serial cable is provided to connect the serial interface to the interface of the USHA card.

10. The UPS system as claimed in claim 6, wherein the UPS comprises a control board and a bus, the connector of the USHA card is connected to the control board via the bus.

11. A method to establish network function of an Uninterrupted Power Supply (UPS) system, comprising the steps of:
    providing a UPS SNMP HTTP AGENT (USHA) card electrically connectable between a network control system and a UPS for data transmission therebetween;
    equipping said UPS with a switch function so as to switch said USHA card to be in a first status, a CPU of the USHA card actuated by the switch to send a first control signal to control ports respectively of the first and second multiplexers;

connecting a signal output port and a first signal input port of the first multiplexer according to the control signal, a receiver of the first transceiver electrically connected to a transmitter of the second transceiver via the first signal input port and the signal output of the first multiplexer;

connecting the signal output port and a first signal input port of the second multiplexer according to the control signal, a receiver of the second transceiver electrically connected to a transmitter of the first transceiver via the first signal input port and the signal output of the second multiplexer;

communicating the network control system to a control board of the UPS via the first and second transceivers of the USHA card;

equipping said UPS with the switch function so as to switch said USHA card to be in a second status, the CPU of the USHA card is actuated to send a second control signal to the control ports respectively of the first and second multiplexers;

connecting the signal output port and a second signal input ports of the first multiplexer according to the second control signal; and connecting the signal output port and a second signal input port of the second multiplexer according to the second control signal, the first and second transceivers electrically connected via the CPU, the UPS be remotely managed via the USHA card.

12. The method as claimed in claim 11, wherein said switch function is performed by a DIP switch installable on said USHA card.

* * * * *